United States Patent [19]

Lange et al.

[11] 4,045,274
[45] Aug. 30, 1977

[54] APPARATUS FOR SURFACE TREATMENT OF WOODEN PANELS

[75] Inventors: Wolfgang Lange; Werner Schafer, both of Essen, Germany

[73] Assignee: Becker & Van Hullen, Niederrheinische Maschinen Fabrik, Krefeld, Germany

[21] Appl. No.: 662,683

[22] Filed: Mar. 1, 1976

Related U.S. Application Data

[60] Division of Ser. No. 491,104, July 23, 1974, abandoned, which is a continuation-in-part of Ser. No. 286,401, Sept. 5, 1972, abandoned.

[30] Foreign Application Priority Data

Sept. 4, 1971 Germany .......................... 2144347

[51] Int. Cl.² .......................... B30B 7/00; B30B 15/34
[52] U.S. Cl. .......................... 156/492; 156/290; 156/583
[58] Field of Search ................. 100/76, 233, 236, 238, 100/264; 156/202, 204, 212, 216, 226, 227, 475, 479, 480, 481, 492, 583, 290

[56] References Cited

U.S. PATENT DOCUMENTS

| | | | |
|---|---|---|---|
| 1,031,156 | 7/1912 | Williams | 100/236 |
| 1,249,109 | 12/1917 | Jones | 100/236 |
| 1,875,975 | 9/1932 | Alm | 100/233 |
| 2,621,142 | 12/1952 | Wetherell | 156/216 |
| 3,298,150 | 1/1967 | Ahlquist | 156/213 |
| 3,580,770 | 5/1971 | Dyal | 156/216 |
| 3,867,226 | 2/1975 | Guido et al. | 156/583 |
| 3,899,913 | 8/1975 | Schlosser et al. | 156/481 |
| 3,905,861 | 9/1975 | Fritz | 156/475 |

*Primary Examiner* — Charles E. Van Horn
*Assistant Examiner* — Basil J. Lewris
*Attorney, Agent, or Firm* — Herbert E. Kidder

[57] ABSTRACT

The method of surface treatment of wooden panels which comprises drawing off carrier strips or sheets impregnated with hardenable synthetic resin from supply rollers, and laying the strips onto the top and bottom surfaces of the panel. The sheets are attached to the panel along the edges thereof by heat-bonding, using a heated tool which presses the strip to the corner formed by the intersection of the surface of the wooden panel with the perpendicular side edges thereof. The wooden panel, with carrier sheets attached thereto along its edges, is then placed in a heated press, where the sheets are pressed and heat-bonded to the surfaces of the panel.

2 Claims, 2 Drawing Figures

APPARATUS FOR SURFACE TREATMENT OF WOODEN PANELS

CROSS-REFERENCE TO RELATED APPLICATIONS:

This is a division of application Ser. No. 491,104, filed July 23, 1974, now abandoned, which in turn is a continuation-in-part of application Ser. No. 286,401, filed Sept. 5, 1972, now abandoned.

DESCRIPTION OF THE INVENTION:

The invention relates to a method for the surface treatment of wooden panels by pressing carrier strips, or sheets containing hardenable synthetic resin, onto them at high temperatures, the carrier strips or sheets being drawn off from supply sollers and laid onto the top or bottom surface of the panel to be coated, the sheets being fixed and cut on this panel in the area of the edge by longitudinal or transverse alignment in punctiform manner or in strips by the influence of heat, the prepared pressed pack then being introduced in known manner into the heating press. The term "punctiform" is defined as: "having the form or character of a point". Thus, when we say that the sheets are attached to the panels in a punctiform manner, we mean that they are attached to a plurality of points along the edge corner of the panel, and such punctiform attachment is therefore analogous to spot welding.

When carrying out the method disclosed in German Auslegeschrift No. 2,013,063 it transpired that the fixing of the sheets on the panel in the area of the edge made it necessary to remove this area of fixing after coating by means of trimming, and this was disadvantageous because the finished panel showed surface defects at the points where fixing occurred.

It has now been shown that it is possible to dispense with trimming of the panel, a process which is always accompanied by a not inconsiderable loss of material, if according to the invention the sheets are fixed on the edge of the panel by the influence of heat. The term "edge" is taken to refer to the geometrical line, or corner, which is formed by the intersection of the top surface with the perpendicular side edges. This line is thus produced by the vertices of the angle formed by the upper or lower side of the panel with the cutting surface.

Although only one line is geometrically available to fix the sheet, it has been shown that the sheets can be fixed with sufficient firmness according to the invention. The sheets are attached to the panel in punctiform manner or on a continuous basis by being pressed with a heated tool on the edge, no recognizable points of impression resulting after pressure has been applied in the case of punctiform fixing. In the case of continuous fixing there is a slight bevel, which is similarly non-disruptive in nature.

The heated tool is expediently chrome-plated or provided with a thin polytetrafluoroethylene coating in order to prevent the synthetic resin adhering to the heated tool.

In a particular embodiment of the method according to the invention, the carrier strips are cut to desired format before fixing to the wooden panels in accordance with the invention.

The advantageous features of the invention will become apparent to those skilled in the art from the following detailed description of the preferred embodiment thereof, with reference to the accompanying drawings.

Figure 1:
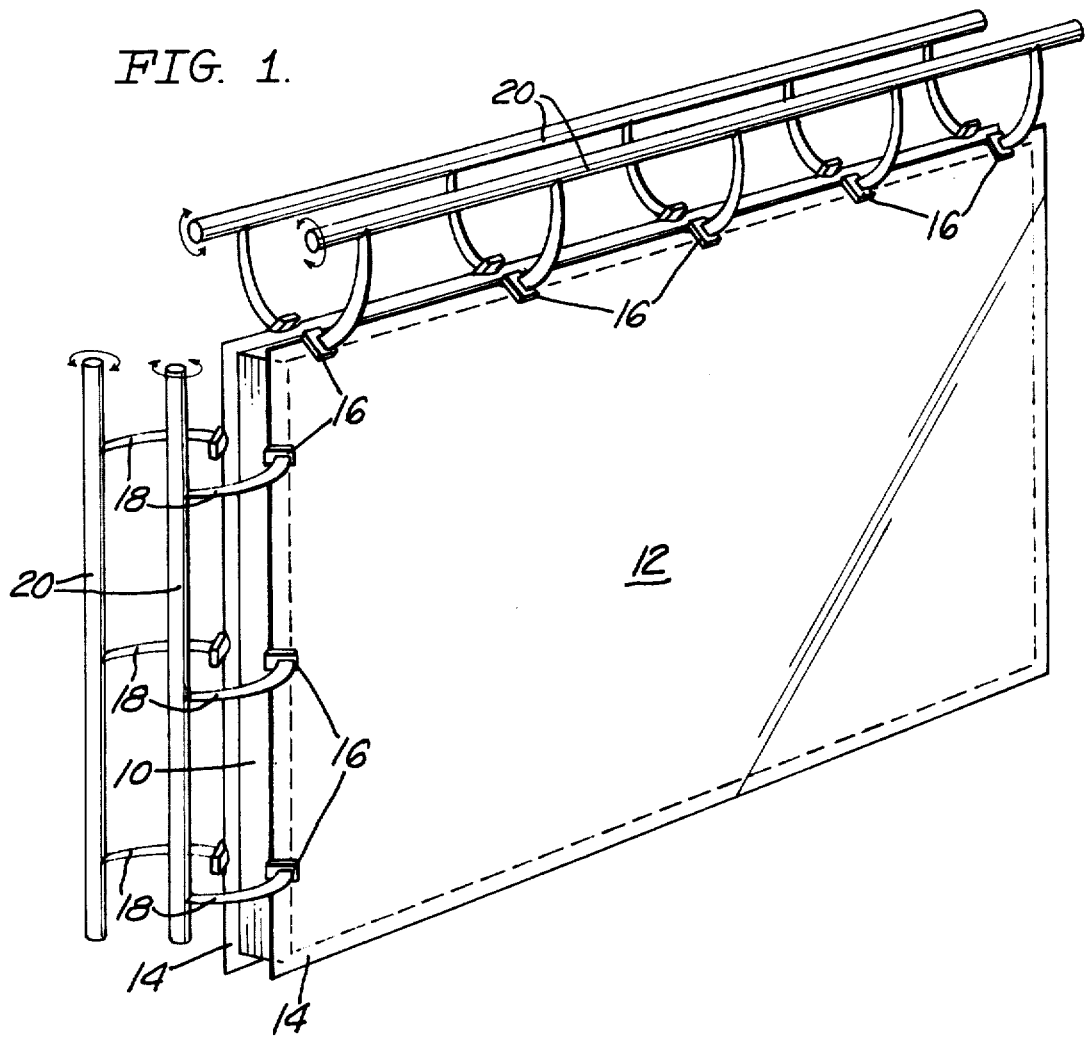
FIG. 1 is a fragmentary schematic perspective view of a panel and apparatus for carrying out the method of the invention.

DESCRIPTION OF THE PREFERRED EMBODIMENT:

In the drawings, the reference numeral 10 designates a flat, rectangular panel of plywood or chipboard, having carrier strips, or sheets 12 laid against opposite sides thereof, said sheets 12 containing hardenable synthetic resin. The sheets 12 are laid onto the top or bottom surfaces (or both surfaces, as in the drawings) of the panels, and the sheets are cut slightly larger than the panels, so that narrow marginal strips 13 project beyond the edges of the panel.

Figure 2:
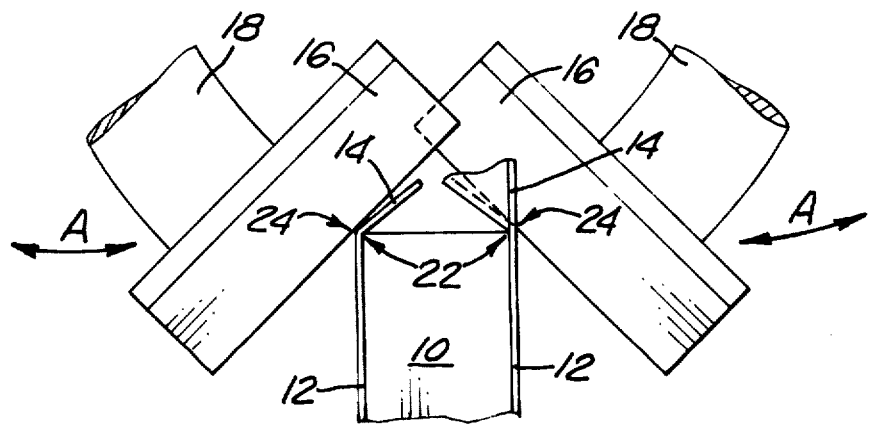
FIG. 2 is an enlarged fragmentary end view along one edge of the panel, showing how the carrier sheets are attached in a punctiform manner to the sharp corner edges formed by the intersection of the face planes of the panel with the perpendicular edge plane.

The sheets 12 are first tacked to the panel 10 before being placed in the heated press, where the sheets 12 are subsequently pressed flat against the faces of the panel and head-bonded thereto. The tacking of the sheets 12 is accomplished by means of a plurality of small heated platens 16 carried on arms 18 that are fixed to oscillating shafts 20. The heated platens 16 swing through arcuate paths, as shown by arrows A in FIG. 2, and as the platens approach the panel 10, they break the marginal strips 14 over the sharp corners at 22 formed by the intersection of the face planes of the panels with the perpendicular edge planes. When the platens 16 make full pressure contact with the sheet 12 and corner 22, the sheet is heat bonded to the panel at the line of contact shown at 24. As the sheet 12 is attached to the sharp corner edges 22 only where they are contacted by the platens 16, it will be evident that this intermittent attachment at a number of points is punctiform in character. A most important feature of this method of attachment is that the tacking bonds at 24 do not encroach on the face area of the panels, and therefore there is no loss of panel due to edge trimming, as is necessary when the sheets are attached as shown by German Pat. No. 2,013,063.

The pressure angle of the platens 16 is 45 degrees, and bonding of the sheet 12 to the corner edges 22 is therefore substantially linear. The platens 16 do not contact the flat faces of the panel, and therefore there are no surface imperfections formed in the faces which would have to be removed. After the sheets 12 have been pressed and heat-bonded to the face planes of the panel 10, the excess marginal strip portion 14 is trimmed off.

Instead of punctiform attachment, the sheets 12 could also be attached to the panel linearly along the full length of the corner edges 22, in which case the bond is a very thin line.

While we have shown and described in detail one embodiment of the invention, it will be understood by those skilled in the art that the invention is not limited to such details except as set forth in the following claims.

What we claim is:

1. Apparatus for applying a sheet impregnated with heat-sensitive, hardenable synthetic resin to at least one surface of a wooden panel, in which the sheet is attached to the panel solely along the corner edges formed by the intersection of the face plane of the panel with the perpendicular edge planes along the longitudinal and transverse edges of the panel, said apparatus comprising:

a plurality of narrow, individual flat-faced heating platens spaced apart from one another along the length of the edge of the panel, said individual platens being mounted on arms projecting from a rotatable shaft that is rocked through an angular distance to bring the platens into contact with the sheet;

said individual platens being moved simultaneously into contact with the sharp corner edge of the panel so as to bend the edge of the sheet over the corner edge of the panel and apply pressure and heat to the sheet solely along a plurality of longitudinally spaced, linear contact areas substantially limited to the corner edge;

said flat faces of said heating platens forming substantially 45° angles with the face planes of the panel and with said edge planes.

2. Apparatus as in claim 1, in which a second resin-impregnated sheet is applied to the opposite face of the panel at the same time that the first-mentioned sheet is applied to its panel surface, said apparatus further including a second set of narrow, individual flat-faced heating platens spaced apart from one another along the length of the edge of the panel on the side opposite the first-mentioned surface, said second set of platens being opposite the corresponding platens of the first-mentioned set, and being mounted on arms projecting from a second rotatable shaft that is rocked simultaneously with the first-mentioned shaft, so as to cause the second set of platens to contact the sharp corner edge of the panel and bend the edge of the second sheet over the corner edge, thereby bonding the second sheet at a plurality of longitudinally-spaced, linear contact areas substantially limited to the corner edge, at the same time that the first sheet is attached to the first-mentioned surface.

* * * * *